2,928,720
METHOD OF PREPARING OXYFLUORIDES AND THIOFLUORIDES

Charles W. Tullock, Wilmington, Del., assignor to E. I. du Pont de Nemours and Company, Wilmington, Del., a corporation of Delaware No Drawing. Application April 25, 1957
Serial No. 654,986

15 Claims. (Cl. 23—14)

This invention relates to a new method of preparing oxyfluorides and thiofluorides of certain non-metallic elements.

It is known (U.S. Patent 2,722,559) that inorganic oxyfluorides, in particular those of sulfur, selenium and phosphorus, react with carbon at high temperatures to produce highly valuable fluorocarbons, among which may be mentioned products of great industrial importance such as carbon tetrafluoride and tetrafluoroethylene. The use of the inorganic oxyfluorides of sulfur, selenium and phosphorus in this and other technical applications has been limited by the fact that the published methods of preparing these compounds have used expensive reactants and/or procedures. These methods have been summarized by Burg in "Fluorine Chemistry," edited by J. H. Simons (1950) vol. I, pp. 93–96 and 100–102.

Sulfuryl fluoride has been prepared from sodium fluoride, an inexpensive reactant, but temperatures of 400° C. are necessary, and the yields are extremely low [Woyski, J. Am. Chem. Soc. 72, 919 (1950)]. One object of this invention is to prepare this and certain other oxyfluorides using readily available and relatively inexpensive reactants. Another object is to prepare these compounds by a simple process. Further objects will become apparent from the following disclosure.

This invention is a process of preparing inorganic oxyfluorides and thiofluorides which comprises reacting sodium fluoride with an inorganic oxychloride of sulfur, selenium or phosphorus, or with phosphorus thiochloride, in a liquid reaction medium having a dielectric constant of at least 20 and which is miscible with the oxychloride or thiochloride reactant and essentially non-reactive with it at the reaction temperature.

One reactant for the novel process is sodium fluoride. This inexpensive compound can be used as the technical grade without costly purification.

The other starting material is an inorganic oxychloride of sulfur, selenium or phosphorus or the thiochloride of phosphorus. These compounds are thionyl chloride, $SOCl_2$; sulfuryl chloride, $SO_2Cl_2$; selenium oxychloride, $SeOCl_2$; phosphorus oxychloride, $POCl_3$; and phosphorus thiochloride, $PSCl_3$. These compounds can be prepared by methods described in the literature.

The relative proportions of the reactants are not critical. They are important only from the standpoint of achieving good conversions to the oxyfluoride or thiofluoride. Accordingly, it is desirable, though not necessary, to use at least one mole, and preferably from one to two moles, of sodium fluoride for each chlorine atom to be converted to fluorine.

The use of a reaction medium having a high dielectric constant, at least 20 when measured at or above 20° C., is critical in this process. In the absence of such a medium, the reaction does not take place, or only to a small or negligible extent, at moderate temperatures. The function of a reaction medium having a high dielectric constant is not clearly understood. It is possible that the suitable liquids either solvate the chlorine atoms, making them more reactive, or ionize the oxychloride or thiochloride. The suitability of a liquid medium is not solely or chiefly connected with its ability to dissolve sodium fluoride since many of them have little or no solvent action on this salt.

The reaction medium should be liquid under the operating conditions and it should be miscible in the liquid state with the inorganic oxychloride or thiochloride.

The reaction medium must, of course, be substantially inert under the operating conditions towards the reactants and reaction products, particularly the highly reactive oxy- or thiohalides. There is a simple test whereby media undesirably reactive with the oxyhalides can be recognized. When mixed with the starting oxychloride or thiochloride at ordinary or moderately high temperature, e.g., up to 100° C. an undesirably reactive liquid medium being tested will form a gas, e.g., hydrogen chloride, sulfur dioxide and the like, usually with evolution of heat and appearance of color. Thus, certain liquids can readily be recognized as unsuitable in spite of their favorable dielectric constants. These include, for example, water, alcohols, aldehydes, ketones, carboxylic acids and anhydrides, certain nitriles and certain amides.

The above-described test also shows that certain media, while suitable with some oxyhalides, are not recommended with others. For example, hydrogen cyanide is an excellent reaction medium with thionyl chloride but is less desirable with sulfuryl chloride, with which it is somewhat reactive although even then the reaction product contains substantial amounts of the oxyfluoride, in this case sulfuryl chlorofluoride. It is of course necessary that the reaction medium as well as the reactants be substantially anhydrous.

The amount of reaction medium present in the reaction mixture is not critical. In practice, there is normally used at least 0.25 mole, and preferably from 0.5–5 moles of reaction medium per mole of oxychloride or thiochloride.

Suitable reaction media, all having a dielectric constant of at least 20 at 20° C., include hydrogen cyanide, acetonitrile, propionitrile, butyronitrile, crotononitrile, adiponitrile, benzonitrile, methyl cyanoacetate, ethyl cyanoacetate, N,N-dimethylformamide, N,N-dimethylacetamide, nitromethane, nitroethane, 1-nitropropane, 2-nitropropane, nitrobenzene, o-nitrotoluene, p-nitrotoluene, 1-chloro-2-nitrobenzene, methyl o-nitrobenzoate, dimethyl sulfate, diethyl sulfate, cyclic tetramethylene sulfone, N-nitrosodimethylamine, $\beta,\beta'$-dichlorodiethyl ether etc. The preferred reaction media, because of their inertness towards the oxyhalides under the operating conditions, are the carbonitriles, N,N-disubstituted carbonamides, and sulfones which, except for the functional groups, are hydrocarbon. Otherwise stated, the preferred reaction media are those compounds, having dielectric constant of at least 20 at or above 20° C., which contain only carbon, hydrogen and one of the groups

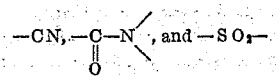

In a few instances, some specific reaction media show a tendency to form complexes with the reaction products. This happens, for example, with phosphorus oxyfluoride and acetonitrile or dimethylformamide, or with thionyl fluoride and nitroethane. In such cases, the reaction takes place with good conversions, as evidenced by the amount of sodium chloride formed, but the oxyfluoride remains to a large extent bound to the reaction medium. This difficulty is remedied either by using a non-complexing medium or by breaking the complex which has formed. This can be done by treating the liquid reaction product with a miscible inert solvent, e.g., benzene, and distilling the volatile oxyfluoride out of the mixture, or simply by heating the complex under reduced pressure.

The reaction proceeds, though slowly, at temperatures as low as about 0° C. or even lower. It is, in fact, frequently exothermic initially. However, a more practical reaction rate is obtained by operating at moderately elevated temperatures, e.g., above 20° C. There is no upper limit of temperature except that which is dictated by the increased reactivity of many reaction media as the temperature increases. In practice, it is rarely necessary to operate at temperatures above 150° C., and the preferred temperature range is that between 20 and 125° C. Good conversions are usually obtained in that temperature range within a few hours.

The process can be carried out at or near atmospheric pressure, the resulting fluorinated compounds, which are gases or highly volatile liquids, being permitted to escape from the reaction mixture and to condense in cold receivers. Alternatively, and especially when the reaction medium is a low boiling liquid, the reaction can be carried out in closed, pressure-resistant vessels under the autogenous pressure developed at the operating temperature.

In addition to completely fluorinated reaction products (thionyl fluoride, sulfuryl fluoride, selenium oxyfluoride, phosphorus oxyfluoride and phosphorus thiofluoride), there may be formed, depending upon the reaction conditions, products in which only part of the chlorine atoms of the starting oxy- or thiochloride are replaced by fluorine. Such products, for example, include sulfuryl chlorofluoride, $SO_2FCl$, phosphorus oxydichlorofluoride, $POFCl_2$, and phosphorus thiodichlorofluoride, $PSFCl_2$. The reaction can be controlled so as to furnish substantial amounts of these incompletely fluorinated materials by using sodium fluoride in insufficient amount for complete fluorination and by using conditions as mild as possible. The partly fluorinated products can be separated from the fully fluorinated ones by fractional distillation.

The non-volatile reaction product is a mixture of sodium fluoride and sodium chloride, the latter being formed in amounts corresponding to the extent of the reaction. The reaction medium remains unchanged and it can be recovered by conventional methods, e.g., filtration or distillation.

The following examples illustrate the invention:

*Example I*

To each of two 500 ml. stainless steel cylinders was added 160 g. of sodium fluoride and 118 g. of thionyl chloride. The cylinders were cooled to liquid nitrogen temperature and pumped free of air, after which 28 g. of hydrogen cyanide was distilled into each vessel. The cylinders were then closed and allowed to stand at room temperature (18-22° C.) for 24 hours. The combined gaseous product (211 g.) was then distilled through an efficient fractionating column. There was obtained 159 g. (93% conversion) of thionyl fluoride, B.P. −46° C., and 33 g. of hydrogen cyanide was recovered. There was no unreacted thionyl chloride.

This example was essentially duplicated in three additional runs except that the molar ratios of sodium fluoride to hydrogen cyanide were, respectively, 1.2:1, 1.6:1 and 3.2:1. The conversions to thionyl fluoride, based on the amount of reaction product volatile at 0° C. and essentially confirmed by the amount of chloride ion present in the residual sodium fluoride/sodium chloride mixture, were 95%, 97% and 58%, respectively.

When the hydrogen cyanide was omitted completely, no reaction took place under the same conditions, even when the reaction time was extended to four days at room temperature.

*Example II*

Into a flask provided with spiral condenser, thermometer and dropping funnel was placed 84 g. of sodium fluoride and 118 g. of acetonitrile, and 60 g. of thionyl chloride was added over a period of 15 minutes, during which time the reaction mixture warmed up spontaneously to 43° C. The reaction mixture was then heated to 74° C. over a period of 30 minutes and refluxed for 1.4 hours. The volatile products formed in the reaction were led to a trap cooled to −78° C., where they condensed. Distillation of this condensate gave 33 g. (77% conversion) of thionyl fluoride.

In contrast with this example, when sodium fluoride and thionyl chloride were heated at 72–75° C. for 5.25 hours in carbon tetrachloride, a liquid of low dielectric constant, no thionyl fluoride could be isolated. Chloride ion analysis of the solid product showed that, if conversion had taken place, it was at most to the extent of 1.9%.

*Example III*

Thionyl chloride was reacted with sodium fluoride, using the quantities and conditions of Example II except that 185 g. of tetramethylene sulfone was used as the reaction medium. There was obtained 22 g. (52.4% conversion) of thionyl fluoride.

When this example was repeated, except that 157 g. of nitroethane was used as the reaction medium and the reaction mixture was refluxed for 1.45 hours, reaction took place to the extent of 39% as indicated by chloride ion analysis in the residual solid. However, only a small amount of thionyl fluoride was isolated, owing to formation of a complex with the nitroethane.

*Example IV*

To a mixture of 100 g. of sodium fluoride and 133 g. of acetonitrile in an apparatus similar to that of Example II was added in portions over a period of five minutes 66.5 g. of sulfuryl chloride. The mixture warmed up spontaneously, then sufficient heat was provided to keep the acetonitrile gently refluxing for 3.4 hours. The material condensed in the cold trap was distilled in a low temperature still, giving 28 g. (63% conversion) of sulfuryl chlorofluoride, $SO_2FCl$, B.P. 5–7° C.

*Example V*

A mixture of 65 g. of sulfuryl chloride, 84 g. of sodium fluoride and 61 g. of acetonitrile was stored for 24 hours in a stainless steel cylinder free of air at room temperature, after which the cylinder was warmed to 88–90° C. for 4 hours. Distillation of the volatile products gave 11 g. of sulfuryl fluoride, B.P. −48 to −52° C., and 33 g. of sulfuryl chlorofluoride. This amounted to an overall conversion to fluorinated products of about 80%.

*Example VI*

To a mixture of 84 g. of sodium fluoride and 141 g. of dimethylformamide in an apparatus similar to that of Example II was added 66.5 g. of sulfuryl chloride over a period of about 30 minutes. Considerable heat was evolved. The reactants were then maintained at 69–80° C. for 1.6 hours. Distillation of the volatile products collected in the cold trap gave 11 g. of sulfuryl fluoride and 20 g. of sulfuryl chlorofluoride.

In contrast, heating sodium fluoride and sulfuryl chloride at 76–78.5° C. for 5.2 hours in benzene, a liquid of low dielectric constant, gave no sulfuryl fluoride or chlorofluoride. Chloride ion analysis of the solid showed that if conversion had taken place, it was at most to the extent of 3.6%.

*Example VII*

To a mixture of 75 g. of sodium fluoride and 154 g. of tetramethylene sulfone in an apparatus similar to that of Example II was added 106 g. of selenium oxychloride, $SeOCl_2$, over a period of one hour. Considerable heat was evolved during the addition. The reactants were held at 83–115° C. for about 50 minutes and the product was removed by reducing the pressure to 2 mm. and keeping the mixture at 112–167° C. for 1.6 hours. The condensate collected in the cold trap (40 g.) gave, on distillation, 24 g. of selenium oxyfluoride, B.P. 30–32° C. at 6–8 mm. pressure, identified by its selenium and fluoride content.

*Analysis.*—Calcd. for SeOF$_2$: Se, 59.40; F, 28.57. Found: Se, 58.67; F, 29.57.

Example VIII

A flask was provided with a thermometer, an upright spiral condenser connected to a trap cooled to −78° C. and a bottle containing 84 g. of sodium fluoride attached to the flask by flexible connectors. A solution of 75 g. of phosphorus oxychloride in 154 g. of tetramethylene sulfone was placed in the flask and warmed to 48° C., and the sodium fluoride was added in portions from the bottle over a period of 1.7 hours. Considerable heat was evolved following each addition of sodium fluoride. After the addition was complete, the reactants were kept at 71–124° C. for 0.75 hour, then at 124–128° C. for one hour. A total of 33 g. of condensate was collected in the cold trap. Distillation of 30 g. of this condensate through a low temperature still gave 22 g. of phosphorus oxyfluoride, B.P. −40 to −44° C.

Example IX

Using an apparatus similar to that of Example VIII and provided with a magnetic stirrer, 31 g. (0.73 mole) of sodium fluoride was added in portions to 109 g. (0.71 mole) of phosphorus oxychloride in 154 g. of tetramethylene sulfone. The gradual addition of the sodium fluoride continued for 1.4 hours, and the reaction mixture was maintained throughout at 66–71° C. and under a reduced pressure of 200 mm., then at 112–120 mm. for 0.6 hour after all the sodium fluoride had been added. Distillation of the condensate in the cold trap gave 5 g. of phosphorus oxydichlorofluoride, POFCl$_2$, B.P. 53–70° C., further identified by its nuclear magnetic resonance spectrum, and 55 g. of recovered phosphorus oxychloride. No attempt was made to isolate the phosphorus oxyfluoride and phosphorus oxychlorodifluoride.

Example X

A mixture of 84 g. of sodium fluoride and 154 g. of tetramethylene sulfone was placed in an apparatus similar to that of Example II, and 85 g. of phosphorus thiochloride was added over a period of one-half hour. The reactants were then heated to reflux at a pot temperature of 129–163° C. for 2.7 hours. Distillation of the material collected in the cold trap gave 32 g. (53% conversion) of phosphorus thiofluoride, PSF$_3$, B.P. −48 to −52° C., which was further identified by its infrared spectrum. This material inflames spontaneously in the air. There was obtained in addition 1.5 g. of phosphorus thiodichlorofluoride, PSFCl$_2$, B.P. 62–66° C., which was further identified by its nuclear magnetic resonance spectrum.

In contrast, heating sodium fluoride and phosphorus thiochloride at 120–133° C. for 5 hours in xylene, which has a low dielectric constant, gave no phosphorus thiofluoride or thiodichlorofluoride. Chloride ion analysis of the solid product indicated a maximum conversion of about 4%.

This invention provides a simple method for obtaining in satisfactory conversions and from readily available starting materials the oxyfluorides of sulfur, selenium and phosphorus, as well as phosphorus thiofluoride.

I claim:
1. The method of synthesizing at least one member of the class consisting of (A) oxyfluorides and oxychlorofluorides of sulfur, selenium and phosphorus, and (B) thiofluorides and thiochlorofluorides of phosphorus which comprises reacting sodium fluoride with a second reactant of the group consisting of the oxychlorides of sulfur, selenium and phosphorus, for the synthesis of (A), and phosphorus thiochloride, for the synthesis of (B), in a liquid reaction medium which is a compound (1) containing only carbon, hydrogen and a member of the class consisting of

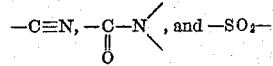

(2) possessing a dielectric constant of at least 20 at 20° C., and (3) being miscible with and essentially inert to said second reactant.

2. The method of claim 1 in which sodium fluoride is reacted with thionyl chloride to yield thionyl fluoride.
3. The method of synthesizing thionyl fluoride which comprises reacting sodium fluoride with thionyl chloride in liquid hydrogen cyanide.
4. The method of synthesizing thionyl fluoride which comprises reacting sodium fluoride with thionyl chloride in liquid acetonitrile.
5. The method of synthesizing thionyl fluoride which comprises reacting sodium fluoride with thionyl chloride in liquid tetramethylene sulfone.
6. The method of claim 1 in which sodium fluoride is reacted with sulfuryl chloride to yield sulfuryl chlorofluoride.
7. The method of claim 6 in which sulfuryl fluoride is formed simultaneously with the sulfuryl chlorofluoride.
8. The method of claim 7 in which the reaction medium is acetonitrile.
9. The method of claim 7 in which the reaction medium is dimethyl formamide.
10. The method of claim 1 in which sodium fluoride is reacted with selenium oxychloride to yield selenium oxyfluoride.
11. The method of claim 10 in which the reaction medium is tetramethylene sulfone.
12. The method of claim 1 in which sodium fluoride is reacted with phosphorus oxychloride to yield phosphorus oxyfluoride.
13. The method of claim 12 in which the reaction medium is tetramethylene sulfone.
14. The method of claim 1 in which sodium fluoride is reacted with phosphorus thiochloride to yield a phosphorus thiofluoride.
15. The method of claim 14 in which the reaction medium is tetramethylene sulfone.

References Cited in the file of this patent

UNITED STATES PATENTS 2,562,432   McCann et al. _____ July 31, 1951

OTHER REFERENCES

Booth et al.: "Jour. of Am. Chem. Soc." (vol. 36), June 1936, pages 63–66.

Woyski: "Jour. of Am. Chem. Soc." (vol. 72), February 1950, pages 919–921.